United States Patent [19]

Morishita et al.

[11] Patent Number: 4,828,593

[45] Date of Patent: May 9, 1989

[54] PROCESS FOR THE PRODUCTION OF GLASS

[75] Inventors: Hiroshi Morishita; Terukazu Imayoshi; Hitoshi Kikuchi, all of Kanagawa; Akihiro Nakamura, Tokyo, all of Japan

[73] Assignee: Japan Oxygen Co., Ltd., Tokyo, Japan

[21] Appl. No.: 126,102

[22] PCT Filed: Feb. 27, 1987

[86] PCT No.: PCT/JP87/00126

§ 371 Date: Oct. 27, 1987

§ 102(e) Date: Oct. 27, 1987

[87] PCT Pub. No.: WO87/05287

PCT Pub. Date: Sep. 11, 1987

[30] Foreign Application Priority Data

Feb. 28, 1986 [JP] Japan .................................. 61-43801
Feb. 28, 1986 [JP] Japan .................................. 61-43802

[51] Int. Cl.$^4$ ........................ C03C 10/00; C03B 19/02
[52] U.S. Cl. .......................................... 65/18.4; 65/33; 65/66; 65/134; 65/136; 65/DIG. 8
[58] Field of Search ...................... 65/18.4, 22, 33, 66, 65/134, 136, DIG. 8

[56] References Cited

U.S. PATENT DOCUMENTS

| | | | |
|---|---|---|---|
| 805,139 | 11/1905 | Hitchcock ............................. | 65/136 |
| 1,549,597 | 8/1925 | Miller .................................... | 65/66 |
| 1,645,080 | 10/1927 | Watson ............................. | 65/136 X |
| 2,726,487 | 12/1955 | Cumming et al. .............. | 65/DIG. 8 |
| 3,883,337 | 5/1975 | Helgesson et al. ...................... | 65/31 |
| 3,927,697 | 12/1975 | Baumler et al. ................. | 65/DIG. 8 |
| 4,013,436 | 3/1977 | Van der Steen .................. | 65/136 X |
| 4,042,361 | 8/1977 | Bihuniak et al. ......................... | 65/18 |
| 4,093,771 | 6/1978 | Goldstein ............................ | 428/312 |
| 4,146,379 | 3/1979 | Copley et al. ............................ | 65/18 |
| 4,225,330 | 9/1980 | Kakuzen et al. ......................... | 65/18 |
| 4,414,282 | 11/1983 | McCollister et al. ............... | 65/32 X |
| 4,416,680 | 11/1983 | Bruning et al. ........................ | 65/144 |
| 4,429,009 | 1/1984 | Pastor et al. .......................... | 65/33 X |
| 4,465,656 | 8/1984 | Pastor et al. .......................... | 423/339 |

FOREIGN PATENT DOCUMENTS

| | | |
|---|---|---|
| 54-24919 | 2/1979 | Japan . |
| 54-36951 | 3/1979 | Japan . |
| 54-36742 | 3/1979 | Japan . |
| 54-74818 | 6/1979 | Japan . |
| 61-58822 | 3/1986 | Japan . |
| 61-58823 | 3/1986 | Japan . |
| 61-58824 | 3/1986 | Japan . |
| 61-58832 | 3/1986 | Japan . |
| 62-30633 | 2/1987 | Japan . |
| 62-30634 | 2/1987 | Japan . |

OTHER PUBLICATIONS

*Vacuum*, The International Journal and Abstracting Service for Vacuum Science and Technology, vol. 13, Pergamon Press, 1963, pp. ii, 47–52.

Boganov et al, "Threshold of Light Breakdown in Hydroxyl-Free High-Purity Vitreous Silica", *Soviet Journal of Glass Physics and Chemistry*, vol. 6, No. 5, Sep.-/Oct. 1980, pp. 383–390 (English language translation by Plenum Publishing Corporation).

Rabinovich et al, "Preparation of High-Silica Glasses from Colloidal Gels: I, Preparation for Sintering and Properties of Sintered Glasses", *Journal of the American Ceramic Society*, vol. 66, No. 10, Oct. 1983, pp. 683–688.

Kingery et al, *Introduction to Ceramics, Second Edition*, John Wiley & Sons, Inc., 1976, pp. 274–275.

*Primary Examiner*—Robert L. Lindsay
*Attorney, Agent, or Firm*—Lowe, Price, LeBlanc, Becker & Shur

[57] ABSTRACT

A process for production of a glass by a vacuum melting method using silica as raw materials comprising heating silica powders in the presence of an accelerator for phase conversion to convert them into a sintered body having cristobalite phase; molding or repowdering the sintered body; containing or filling the resulted sintered body in a container having a desired shape; and then heating and melting it in vacuo for glass formation, or accumulating a plurality of the sintered bodies into a desired shape; and then heating and melting it for glass formation, whereby a high-quality glass ingot having a desired shape or a larger glass ingot can be readily obtained without reduction in productivity.

5 Claims, No Drawings

PROCESS FOR THE PRODUCTION OF GLASS

TECHNICAL FIELD

The present invention relates to a process for the production of a glass by a vacuum melting method using silica as a raw material.

BACKGROUND TECHNOLOGY

In general, glasses as industrial products are produced by heating raw material powders prepared in a prescribed mixing proportion in a crucible or a tank furnace at temperatures higher than the liquids temperature to form a homogeneous mixture in the melted state and then cooling the mixture. In the production of a glass, the glass is usually made transparent, for example, by a means in which the bubbles in the melt formed from the adsorbed gas in the raw materials and the gas generated during the reaction are removed by elevating the temperature of the melt to reduce its viscosity sufficiently thereby allowing the gases and bubbles to float to its surface.

However, in the case of producing a glass from silica as the raw material, because of its high melting point, the temperature cannot be elevated to an extent effective for removing bubbles of restrictions such as the high viscosity of the melt, refractoriness required for the crucible or furnace and for other reasons. If the temperature is elevated excessively, gases are generated by the volatilization of the raw material per se and the reaction between the raw material and the crucible forms all the more bubbles. Therefore, the above-described method cannot be employed. For the reasons set forth above, a method for the production of a transparent quartz glass using silica as the raw material is restricted to any one of the following methods:

(1) A method in which a silica powder is gradually fed into an argon-oxygen plasma flame or an oxygen-hydrogen flame and melted for glass formation and the resulting melt is deposited onto a stand. The generated gases are dissipated from the surface (Verneuil method);

(2) A method in which a porous body composed of silica fine particles is prepared and melted from one end thereof in the band-like state for glass formation. The generated gases leave from the unmelted porous body (zone melting method); and (3) A method in which rock crystal powders prepared to have particle diameter of about 100 μm are placed in a crucible and melted in a vacuum furnace for glass formation. The generated gases are removed by force (vacuum melting method).

However, with respect to the method (1) and method (2), it is well known that an extremely long period of time is required for producing one glass block and productivity is poor, and especially in the case of the Verneuil method, the yield is as low as 30% to 40%. Further, in the case that the argon-oxygen plasma flame is employed as a heat source, though a glass having a small number of residual OH groups and a relatively small number of bubbles can be obtained, the energy cost is high, whereas in the case that the oxygen-hydrogen flame which is low in the energy cost is employed, the problem is that the product has a large number of residual-OH groups. Still further, since the shape of ingots which can be produced is restricted to cylindrical and slender shapes there is a disadvantage to the subsequent processings.

According to the vacuum melting method (3), though a relatively large-sized ingot having a small number of residual OH groups and a high viscosity at high temperatures can be obtained, since the raw material powder filled in a vessel such as a crucible is melted for glass formation, not only is there a difficulty in degassing but also a reaction gas caused by the contact with the vessel is generated, and the resulting glass has a relatively large number of bubbles. Therefore, glass having a high quality cannot be obtained. Further, since the rock crystal powders are used; bubbles tend to be generated due to low purity of the raw material per se also, there is a concern in the raw material supply due to exhaustion of the resources.

Under such a background, the present inventors have developed a process by which a transparent or functional, high-quality glass can be readily produced at a low production cost. This process is characterized in that a silica powder is filled in a suitable vessel, heated in the presence of an accelerator for phase conversion such as an alkali metal component etc. to form a porous body having continuous open pores unified in a crystal phase right below the melting point, and then melted in vacuo for glass formation (see Japanese Patent Application Nos. 181586/84, 181587/84, 181588/84, 170663/85, and 170664/85).

It is known that crystalline silica causes phase conversion from a quartz phase in low-temperature to a tridymite phase and further to a cristobalite phase, depending upon the heating temperature in the heating step. This phase conversion hardly takes place when silica is used alone, but $Li_2O$, $Na_2O$, $K_2O$, $MgO$, $CaO$, $P_2O_5$, and $B_2O_3$ are known to be useful as an accelerator for phase conversion. Since amorphous silica is sintered for glass formation without being crystallized when used alone, in order to crystalize it into a cristobalite phase, the addition of the above-described metal additives is required. Accordingly, in the process of the present invention, the above-described metal component is used in the step for crystallizing the silica powder into the cristobalite phase. However, as will be understood from the foregoing explanation concerning the prior art technologies, in the conventional production methods of glasses, if such a metal component is present in the raw material, such metal component, if any, is likely to cause deterioration in purity of a final product as in the case of OH groups or the like and this is not desirable. That is, in the conventional production methods of glasses, there is a conflicting relation between obtaining a high-quality quartz glass and adding impurities to the raw material or employing a raw material containing impurities.

In view of the foregoing fact, it can be said that the process of the present invention in which an accelerator for phase conversion is added to silica or silica containing an effective component for the phase conversion is selectively used as the raw material is a method not available with the conventional concept. The reasons why this process can readily obtain a high-quality glass as compared with the conventional methods is that the characteristics available with a sintered body consisting of a cristobalite phase produce improved effects when coupled with employment of the vacuum melting method. In other words, as is well known, since the melting point of the sintered body is uniquely determined by the cristobalite phase, the sintered body can be heated up to the temperature right below the melting point and subjected to the degassing processing. Further, since the sintered body consisting of a cristobalite phase is a porous body having continuous open pores, it can be degassed thoroughly and readily. Accordingly, if a metal component, such as Na, which is readily decomposed and vaporized at temperatures below the melting point of the sintered body, is employed as an accelerator for phase conversion, a transparent quartz glass from which the impurities (including the accelerator for phase conversion) have almost completely been removed can be obtained. On the other hand, if an accelerator which is not decomposed and removed at said melting point is selected, a functional glass containing only the accelerator but free from other impurites can be obtained.

The process for production of a glass with which the present invention is concerned provides high-quality glass ingots with good productivity through an organic combination of a crystallization process in which an accelerator for phase conversion is used with a glass forming process by the vacuum melting method, but also involves a drawback in obtaining glass ingots having a desired shape. This is because in the case where a glass ingot having a desired shape such as a plate-like shape or a cylindrical shape is intended, it is difficult to produce a satisfactory sintered body having the desired shape with good productivity.

Furthermore, though the process for production of a glass with which the present invention is concerned has an effect that a relatively large-sized glass ingot can be obtained, in order to obtain a larger ingot, it is necessary to enlarge the size of a container for the sintered body, and the manufacture of such a container becomes difficult, owing to the heat resistibility and other properties required for such a container. Much more, since silica powders to be used as the raw material are low in both bulk density and heat conductivity, in the case that a large-sized sintered body is intended, problems may occur either in production efficiency or in the quality of the ingot.

In view of the foregoings, an object of the present invention is, therefore, to provide a process for production of a glass comprising a crystallization process and a vacuum melting process, whereby a high-quality glass ingot having a desired shape or a larger glass ingot can be readily produced without reduction in productivity.

DISCLOSURE OF THE INVENTION

In order to solve the above-described problems, the present invention relates to a process for production of a glass comprising heating silica powders in the presence of an accelerator for phase conversion to form it into a sintered body having a cristobalite phase and then heating and melting the sintered body in vacuum for glass formation, said process being characerized by:

(1) filling silica powders in a container; heating the filled silica powders to convert the powders into a standing sintered body; molding the sintered body into a desired shape; containing the resulted sintered body in a container corresponding to said desired shape; and then heating and melting it in vacuo for glass formation, (2) filling silica powders in a container; heating the filled silica powders to convert the sintered body into a standing sintered body; accumulating a plurality of the resulted sintered bodies into a desired shape to form an accumulated sintered body; and then heating or melting it in vacuo for glass formation, and (3) repowdering the sintered body having cristobalite phase; filling the repowdered sintered body in a desired container; and then heating and melting it in vacuo for glass formation.

In the process for production of a glass according to the present invention, if production of glass ingots having a desired shape such as a plate-like shape or a cup-like shape or a larger product is required, it is apparent that the sintered body having a desired shape or larger sintered body is obtained in the crystallization process. However, it is not easy to obtain such a sintered body by the crystallization process because not only is such a process closely related to the subsequent glass forming process but also is organically related thereto, since high-quality glass can be obtained only when a number of requirements are met. The requirements that the sintered body must meet, for example, are that the pore size is to be so large as to allow the residual gas to leave but sufficiently small to stand shrinkage in melting and that it is to be free from formation of even small size cracks. Accordingly, many problems are left to be solved in order to meet these requirements, for raw material powders need to be filled in a container since raw material powders are initially involved in obtaining a sintered body. This is because silica powders as raw material have poor heat efficiency due to low bulk density and low heat conductivity, but more because silica powders are difficult to achieve uniform heating therein whereby cracks are likely to be caused. Thus with a plate-like ingot, due to the contact surface between the container and the powder being large and its thickness being small, the problem becomes all the more serious. Further, in the case that a cup-like ingot is intended, since a core is necessarily used, cracks are likely to be caused for the same reasons as those described above. Still further, in the case that a larger glass ingot is intended, a reduction in productivity is unavoidable.

Taking into account the fact that the process for production of glass including the above-described crystallization process has characteristic effects that are not available with the conventional methods, the present inventors have made further researches on the subject process and found a means for obtaining a glass ingot having a desired shape or larger glass ingots by molding or repowdering the resulted sintered body and putting or filling it in a container of a desired shape for glass formation, or by accumulating a plurality of the sintered bodies into a desired shape for glass formation. Filling the raw material in a container can produce characteristic effects that a sintered body which meets the aforesaid requirements can be readily obtained and the thus obtained sintered body is excellent in workability, that sintering is unified in the crystal phase for heating right below the melting point and that the melting point is unique.

As is clear from the foregoing explanation, the process for production of a glass with which the present invention is concerned has effects that it can not only solve the poor yields in raw materials or poor productivity from a long operation time for glass formation required, which have been unavoidable in the conventional methods inclusive of the Verneuil method etc., but it also gives products at an inexpensive cost because the present process does not require a particularly expensive heat source. Such effects can further be accelerated by the process of the present invention, that is, in the conventional methods it was impossible to readily obtain a glass ingot identical or similar to a final product, or a larger glass ingot or the quality was not satisfactory, whereas in the process of the present invention, since a step for obtaining the crystallized sintered body can be effectively used, a product having a satisfactory quality can be obtained. Further, since the sintered body has such characteristic properties that its workability is excellent, there is not encountered any problem in productivity.

A method for using powders of cristobalite phase gives a definite difference in effect over the conventional method in which quartz powders are heated and melted in vacuo for direct glass formation. That is, in the conventional method, melting partly occurs in the glass forming process to cause insufficient degassing, whereby the probability of impurities remaining increases, resulting in problems of quality. On the other hand, in the process of the present invention, since the sintered body is of porous powders unified into a crystal phase and heated right below the melting point which is unique, it is possible to degass at relatively high temperature until melting occurs, whereby high-quality products can be obtained.

BEST MODE TO CARRY OUT INVENTION

The embodiments of the present invention are now described in the following. In the first embodiment thereof, a glass ingot having a desired shape is described.

For example, to amorphous silica powders obtained by oxidizing silicon tetrachloride, an Na component is added as an accelerator for phase conversion in weight ratio of about 1,000 ppm. As a means for addition, since it is desirable to granulate silica powders into large particles without substantially changing the specific surface area thereof, a preferred method are that the silica powders is added to an NaOH aqueous solution and stirred for mixing, followed by dehydrating and drying.

The thus obtained Na component-containing silica powders are filled in a container of a shape indentical or similar to that of a final product and then heated. Any heating means can be optionally used. When the silica powders are heated at 1,100° C. or higher, a sintered body having cristobalite phase and a shape corresponding to that of the filling container is obtained. The thus obtained sintered body is processed into a desired shape by cutting and excising (including by boring). Accordingly, for example, when a glass ingot of a rectangular plate-like shape is required, the silica powders may be processed with a square pillar container to form a sintered body which is then sliced into a plurality of rectangular plates. Further, when a sintered body of cylindrical shape is required, a columnar sintered body may be processed and then bored. The thus processed sintered body is charged in a container having a shape identical or similar to the desired shape and, after placing a core in it, if necessary, is heated for melting in vacuum for glass formation. In this case, the heating is carried out under a reduced pressure of 0.5 mb or less at a temperature of 1,750° C. or higher, whereby a high-quality glass ingot is obtained wherein contaminated impurities and the accelerator for phase conversion added have been almost completely removed. Since the obtained ingot has a shape identical or similar to that of a final product, subsequent processing can be omitted or minimized.

In the second embodiment of the present invention, whose object is similar to that of the above-described first embodiment of the invention, the object is to be achieved by repowdering the sintered body and filling the thus obtained powders in a container having a desired shape, followed by glass formation. That is, the silica powders containing an accelerator for phase conversion are converted into a sintered body having a cristobalite phase by a suitable heating means. In this case, though it is not always necessary to perform heating after filling the silica powders in a container, it is preferred that the heating is performed after filling the silica powders in the container for prevention of contamination by impurities or for the post-treatment. Thereafter, the thus obtained sintered body is repowdered to prepare powders having a bulk density of about 1.1 g/cm$^3$, and the powder is filled in a container having a desired shape and, after placing a core in it, if necessary, is then subjected to glass formation in vacuo in the same manner as described above. While this method has a disadvantage that the resulted product is inferior in quality to the molded sintered body, it has advantages in that the workability is good and in that no care is necessary for crack formation thereon.

The third embodiment of the present invention is concerned with the case in which a larger glass ingot is intended, in which a plurality of the sintered bodies obtained in the same manner as in the first embodiment of the invention are processed into an accumulated sintered body having a desired shape. For accumulation, shapes such as piled a shape or a gathered shape may be used along wit any other optional sizes. However, in order to attain the desired shape and dimension of the ingot, it is necessary to previously determine the shape and dimension of the sintering container. Further, while it is required to mold so that the sintered bodies have contact surfaces free from unevenness, molding can be readily performed because the sintered bodies have good workability. The thus obtained sintered body in accumulation is transferred into a vacuum furnace and heated under a reduced pressure of 0.5 mb or less at a temperature of 1,750° C. or higher, to thereby integrate a plurality of the sintered bodies for glass formation.

EXAMPLE 1

Silica powders containing an Na component in a weight ratio of 1,000 ppm were heated to obtain a sintered body having cristobalite phase and outer diameter of 265 mm and height of 390 mm. This sintered body was sliced to thickness of 70 mm by means of a metal saw to prepare five disks each having an outer diameter of 265 mm and a thickness of 70 mm. These disks were placed in a graphite container having inside diameter of 265 mm and height of 70 mm and transferred into a vacuum furnace, followed by glass formation. There were thus obtained five glass sheets each, weighing about 4.4 kg and having an outer diameter of 265 mm and thickness a of 37 mm.

EXAMPLE 2

The same procedures as in Example 1 were followed to obtain a sintered body having an outer diameter of 265 mm and a height of 390 mm. Thereafter, using a drill, a hollow portion having an inside diameter of 50 mm was formed in the central portion of the sintered body. The resultant sintered body was placed in a graphite container having an inside diameter of 265 mm and a height of 400 mm, and a graphite-made core having an outer diameter of 50 mm was inserted into the hollow portion, followed by glass formation in vacuo.

There was thus obtained a cylindrical glass weighing about 24 kg and having an outer diameter of 265 mm, an inside diameter of 50 mm, and a height of 200 mm.

EXAMPLE 3

Silica powders containing an Na component in a weight ratio of 1,000 ppm were filled in a container and heated to obtain a sintered body having a cristobalite phase. This sintered body was repowdered by grinding to obtain powders having a bulk density of about 1.1 g/cm$^3$. Thereafter, the powder was uniformly filled in a thickness of 200 mm in a rectangular container having an inner size of 300 mm × 300 mm × 300 mm. At this time, the filled powder was weighed to be about 20 kg. The container was placed in a vacuum furnace for glass formation. There was thus obtained a plate-like glass ingot weighing about 19 kg and having a size of 300 mm × 300 mm × 100 mm.

EXAMPLE 4

25 kg of silica powders containing an Na component in a weight ratio of about 1,000 ppm were filled in each of two mullite containers each having an inside diameter of 420 mm and a height of 620 mm and then heated in a heating furnace. The heating was carried out for 75 hours to elevate the temperature to 1,100° C. and the temperature was kept for 5 hours at 1,100° C. There was thus obtained a sintered body having a cristobalite phase, an outer diameter of 265 mm and height a of 390 mm. The two sintered bodies thus obtained were processed by excising the peripheral face thereof with a knife, etc. and then molded into an accumulated sintered body having an outer diameter of 265 mm and a height of 750 mm, followed by heating and melting in vacuo. The heating was carried out for 12 hours to elevate the temperature to 1,730° C. and the temperature was kept for 3 hours at 1,730° C. There was thus obtained an integrated transparent quartz glass weighing 49 kg and having an outer diameter of 265 mm and a height of 400 mm.

POSSIBILITY OF USE IN INDUSTRY

The present invention can be used as a process for production of a glass which is used in tools for apparatus for producing semiconductors, instruments for physics and chemistry, optical materials, and the like.

We claim:

1. A process for the production of a glass, comprising heating silica powders in the presence of an accelerator for phase conversion to form a sintered body having a cristobalite phase and then heating and melting the sintered body in vacuum for glass formation, said process being characterized by filling the silica powders in a container; heating the filled silica powders to form a standing sintered body; shaping the sintered body into a desired shape; placing the resultant sintered body in a container corresponding to said desired shape; and then heating and melting the resultant sintered body in vacuum for glass formation.

2. A process for the production of a glass, comprising heating silica powders in the presence of an accelerator for phase conversion to form a sintered body having a cristobalite phase and then heating and melting the sintered body in vacuum for glass formation, said process being characterized by filling the silica powders in a container; heating the filled silica powders to form a standing sintered body having a cristobalite phase; accumulating a plurality of the resultant sintered bodies into a desired shape to form an accumulated sintered body; and then heating and melting the accumulated sintered body integrally in vacuum for glass formation.

3. A process for production of a glass as claimed in claim 2, characterized in that said container is relatively small in diameter.

4. A process for the production of a glass as claimed in claim 2, characterized in that the outer peripheral face of the sintered body is processed prior to the accumulation step.

5. A process for the production of a glass, comprising heating silica powders in the presence of an accelerator for phase conversion to form a sintered body having a cristobalite phase and then heating and melting the sintered body in vacuum for glass formation, said process being characterized by repowdering the sintered body having a cristobalite phase; filling the resulting cristobalite phase powder in a desired container; and then heating and melting the cristobalite powder in vacuum for glass formation.

* * * * *